(12) United States Patent  
Onoda (10) Patent No.: US 6,716,264 B2
(45) Date of Patent: Apr. 6, 2004

(54) AIR CLEANER (75) Inventor: Tadayuki Onoda, Hamakita (JP)

(73) Assignee: Toyo Roki Seizo Kabushiki Kaisha, Shizuoka-ken (JP)

(*) Notice: Subject to any disclaimer, the term of this patent is extended or adjusted under 35 U.S.C. 154(b) by 12 days.

(21) Appl. No.: 10/079,871

(22) Filed: Feb. 22, 2002

(65) Prior Publication Data

US 2002/0116909 A1 Aug. 29, 2002

(30) Foreign Application Priority Data

Feb. 23, 2001 (JP) ......................... 2001-047912

(51) Int. Cl.⁷ ............................................. B01D 46/42
(52) U.S. Cl. .................... 55/385.3; 55/493; 55/498; 55/503; 55/504
(58) Field of Search ......................... 55/385.3, 493, 55/498, 503, 504, 510, 480

(56) References Cited

U.S. PATENT DOCUMENTS 2,962,121 A * 11/1960 Wilber ........................ 55/480
4,304,580 A * 12/1981 Gehl et al. ................... 55/482
4,482,367 A * 11/1984 Howeth ....................... 55/304
5,688,396 A * 11/1997 Baumann et al. ........... 210/130
6,162,271 A * 12/2000 Bullinger et al. .......... 55/385.3

FOREIGN PATENT DOCUMENTS

EP         0791387 A1 * 8/1997

* cited by examiner

Primary Examiner—Frank M. Lawrence
(74) Attorney, Agent, or Firm—Young & Thompson (57) ABSTRACT An air cleaner, particularly for an engine of a vehicle, includes a case, a cover detachably mounted to the case, a filter element accommodated in the case, the filter element having a cylindrical shape having a central axis therealong, and a pair of support members mounted to the cover so as to be engaged with both end portions of the filter element in an axial direction thereof to hold the filter element between the support members. In such air cleaner, removing the cover from the case removes the filter element from the case together with the cover and disengaging the filter element from the support members removes the filter element from the cover.

6 Claims, 6 Drawing Sheets

AIR CLEANER

BACKGROUND OF THE INVENTION

The present invention relates to an air cleaner for filtering air taken inside an internal combustion engine of a vehicle, and more particularly, to an air cleaner provided with a cylindrical filter element.

Figure 7:
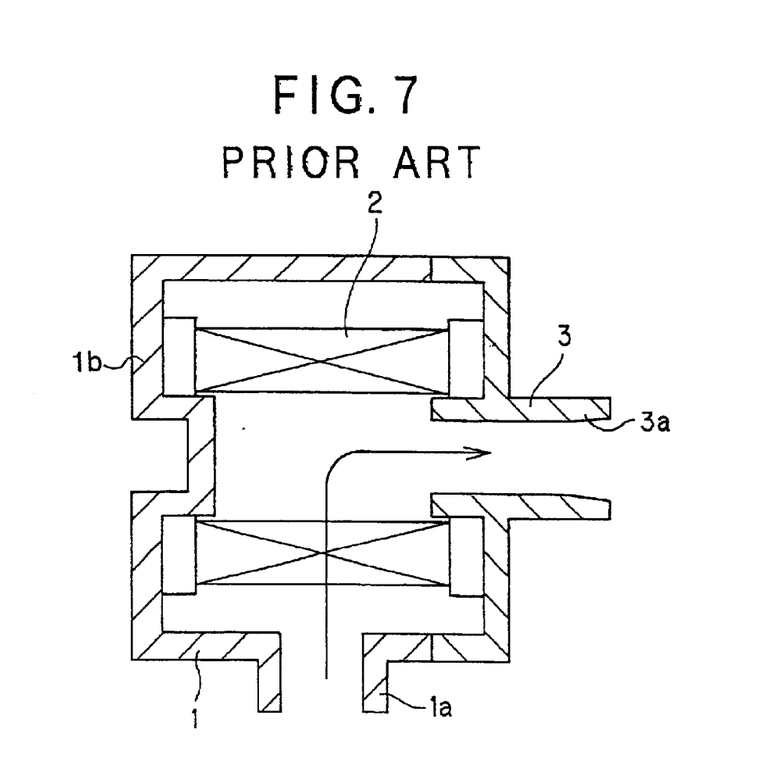
FIG. 7 is a sectional view showing an air cleaner of conventional structure.

A conventional air cleaner of this kind is shown, for example, in FIG. 7. The shown air cleaner is provided with a cylindrical outer case 1, and the case 1 is formed with an integrally formed bottom 1b and an opened end. An air inlet 1a is formed to a side wall section of the case 1, and inside the case 1, there is disposed a cylindrical filter element 2. The opened end is covered by a cover 3 which is formed with an air outlet 3a being coaxial with the cylindrical filter element 2 in an assembled state. When the cover 3 is fitted to the opened end of the case 1, the filter element 2 is pressed and secured in the axial direction between the cover 3 and the bottom 1b of the case 1.

The air introduced inside the case 1 through the air inlet 1a passes the cylindrical filter element 2 thereinto in its radial direction as shown with an arrow. The air passing through the filter element 2 flows in an inner space of the filter element 2 along the central axial direction thereof and then flows out of the case 1 through the outlet 3a formed to the cover 3.

When such air cleaner has been used for a long time, much dust or dirt adheres to a filter or filter paper wound around the filter element, and an intake resistance is increased and air intake performance will be hence deteriorated. For this reason, it is necessary to periodically carry out a maintenance work such as cleaning of a soiled filter element 2 or exchanging of the soiled filter element 2 with a new one. In the case of carrying out such maintenance work, the cover 3 is first removed sideways from the body of the case 1, and the filter element 2 is moved transversely (i.e. axially) in the case 1 and then removed therefrom.

In an internal combustion engine, generally, various elements or equipments are arranged around an air cleaner in an engine room. In an air cleaner of a conventional structure, it is necessary to provide a space around the air cleaner for transversely removing the cover from the case and moving the filter element in the transverse direction. There is a possibility of interference of the filter element with the other elements or equipments disposed around the filter element, thus providing a problem in the maintenance work.

SUMMARY OF THE INVENTION

An object of the present invention is to substantially eliminate defects or problems encountered in the prior art mentioned above and to provide an air cleaner capable of requiring no specific space for maintenance work around the air cleaner and easily carrying out the maintenance work.

This and other objects of the present invention can be achieved according to the present invention by providing, in one aspect, an air cleaner comprising:

a case;

a cover detachably mounted to the case;

a filter element accommodated in the case, said filter element having a cylindrical shape having a central axis therealong; and a pair of support members provided for the cover, wherein said the pair of support members can be engaged with both end portions of the filter element in an axial direction thereof so as to hold the filter element between the support members, and wherein removing said cover from the case removes the filter element from the case together with the cover and disengaging said filter element from the support members removes the filter element from the cover.

According to the structure of this aspect, when the cover is removed from the case, the filter element is also removed together with the cover. The filter element can be disengaged from the cover after removing the cover upward from an engine room of a vehicle, for example, so as not to interfere with peripheral elements or parts. Accordingly, it is not necessary to specifically form a space around the air cleaner for maintenance, and hence, the maintenance itself can be easily performed.

In a preferred embodiment of the above aspect, one of the paired support members is mounted to the cover to be rotatable through a hinge device, and the paired support members can be engaged with the filter element by rotating (pivoting) the one of the paired support members in one direction and disengaged therefrom by rotating the same in another direction. This one of the paired support members comprises a disc plate section, a rotatable (pivotal) shaft attached to the disc plate section and a connection pin connected to the rotatable shaft, and the cover is provided with a pin receiver to receive the connection pin, the connection pin and the pin receiver constituting the hinge device about which the above-mentioned one of the support members is rotated. The pin receiver may be formed with a groove into which the connection pin is fitted when rotated.

The cover is provided with a support member holding rib for holding that one of the paired support members at a predetermined angle with respect to the case to hold the filter element between the paired support members.

According to the location of the hinge device and the pivotal motion of one of the support members, the filter element can be surely supported by the cover, with substantially no shifting of position, when the cover is removed from the case, and the filter element can be thereafter easily disengaged from the cover, improving a maintenance work. Furthermore, when the filter element is assembled in the case and supported by the support members at both ends, the filter element can be placed to the predetermined position with no tilting from a predetermined axial line.

Furthermore, the location of the support member holding rib can ensure the axial holding force, so that the filter element can be surely supported at its both ends by the support members, thus achieving a sealing performance.

In a modified aspect of the present invention, there is also provided an air cleaner for an engine of a vehicle comprising:

a case;

a cover detachably mounted to the case, said cover having an air outlet through which air flows out;

a filter element accommodated in the case, said filter element having a cylindrical shape having a central axis therealong, said central axis of the filter element being directed in a direction other than a vertical direction with respect to a body of the vehicle to which the engine is mounted; and a pair of support members provided for the cover, wherein said the pair of support members can be engaged with both end portions of the filter element in an axial direction thereof so as to hold the filter element between the support members to be coaxial with an axis of said air outlet, and wherein removing said cover from the case removes the filter element from the case and disengaging said filter element from the support members removes the filter element from the cover.

The structure of this modified aspect will be preferably applied to a transverse-setting type air cleaner in which the central axis of the filter element directs in a direction, for example, horizontal direction, other than the vertical direction with respect to the vehicle body. This is because, in the case of the transverse-setting type air cleaner, it is required to set a space for maintenance in the axial direction of the filter element, i.e., approximately horizontal direction of the vehicle body. Further, in such transverse-setting type air cleaner, the air cleaner can be rectilinearly connected in a direction of a throttle body of the engine without bending an air outlet provided coaxially with the axis of the filter element, so that the air resistance becomes not so large. On the contrary, in the structure of the vertical arrangement of the axis of the filter element, it is required to bend the air outlet for connecting to the engine throttle body or like, thus increasing air resistance. Furthermore, a tire house is generally provided in the engine room. However, according to this embodiment, since the filter element is directed to the direction other than the vertical direction to the vehicle body and an arc section of the air cleaner is effectively utilized, the interference of the tire house with the air cleaner can be prevented, and hence, the layout or arrangement of the air cleaner can be made more free.

The nature and further characteristic features of the present invention will be made more clear from the following descriptions with reference to the accompanying drawings.

DESCRIPTION OF THE PREFERRED EMBODIMENT

Figure 1:
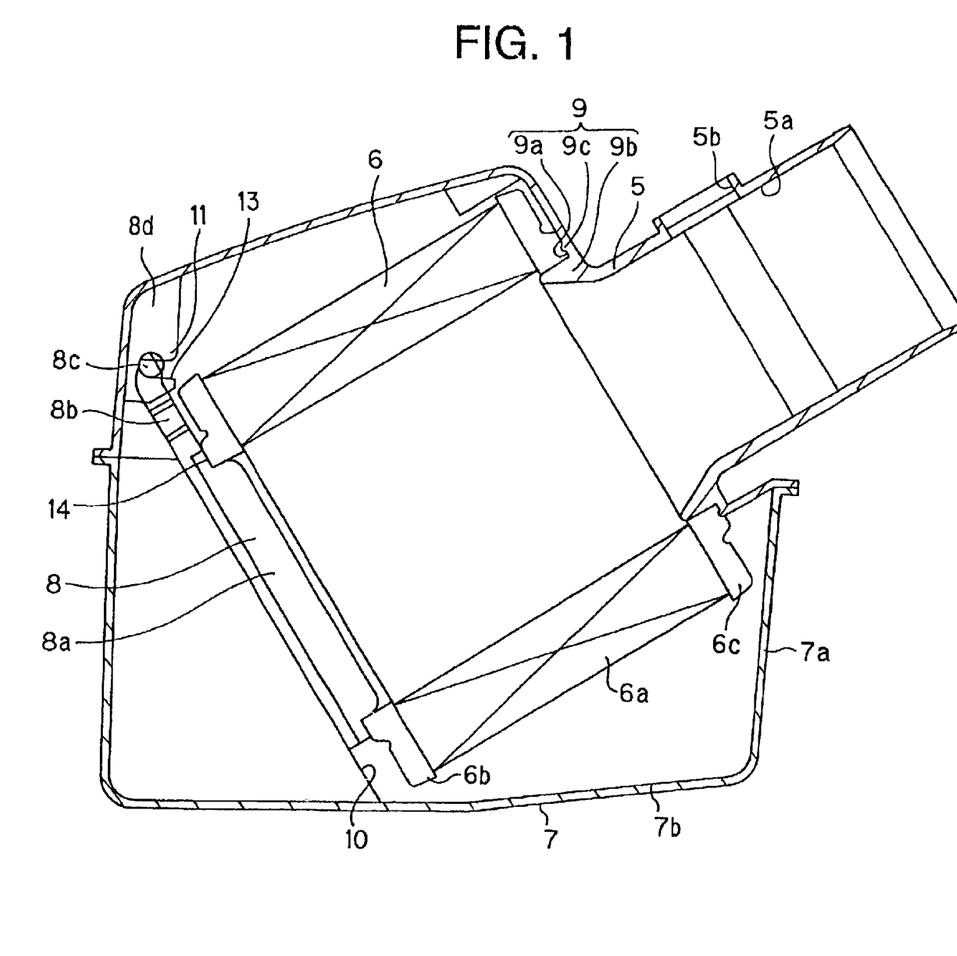
FIG. 1 is a sectional view of an air cleaner according to one embodiment of the present invention.

FIG. 1 represents an air cleaner for an engine of a vehicle according to one embodiment of the present invention, and such air cleaner is generally arranged at an intermediate portion of an intake pipe (suction pipe) fixed to a vehicle body.

With reference to FIG. 1, the air cleaner is formed with an air inlet, not shown, through which air is introduced inside the air cleaner and is provided with a case 7, in which a cylindrical filter element 6 is accommodated, and with a cover 5 detachably mounted to the case 7. The cover 5 is formed with an air outlet 5a through which the air flows out from the air cleaner case 7.

The case 7 is formed with a peripheral wall section 7a and a bottom plate 7b so as to provide a box-shape structure having an opening to which a flange portion is formed. The cover 5 is detachably attached to the flange portion by means of clamp or like, not shown.

The filter element 6 entirely provides a cylindrical outer appearance and is composed of an inner tube disposed on an inner peripheral side of the cylindrical structure, a filter paper 6a wound up around the outer periphery of the inner tube in a wrinkled folded shape and closing end portions 6b and 6c disposed both side end portions of the filter paper 6a. The closing end portions 6b and 6c have annular ring shapes having central opened portions. The air introduced from the air inlet around the filter element 6 inside the case 7 passes the filter element 6 radially inward, and the air that has passed the filter element 6 flows inside the filter element along the central axial direction thereof and then flows out through an air outlet 5a formed to the cover 5. One 6b of the closing end portions may be formed into a disc-shape without being formed as disc or annular shape having the central opening.

Further, the air outlet 5a of the cover 5 may be formed with an air flowmeter mount hole 5b as occasion demands. The cover 5 is further provided with a pair of support members 8 and 9 which are engaged with axial both end portions of the filter element 6 and adapted to support it. According to the location of such support members 8 and 9, the filter element 6 can be supported to be coaxial with the air outlet 5a formed to the cover 5.

One of the support members comprises a support plate 8 to be mounted to the cover 5 to be rotatable by a hinge device, and this support plate 8 comprises a circular plate (disc) 8a having a size capable of closing the central opening of the closing end portion 6b, a pivotal (rotatable) shaft or pin 8b and a connection pin 8c connected, in a perpendicular manner, to the pivotal shaft 8b. A pin receiver 8d is integrally formed to the cover 5, and the hinge device is composed of the connection pin 8c and the pin receiver 8d so that the pin 8c can be rotatable about its central axis. When the connection pin 8c is rotated, the support plate 8 can be rotated (pivoted) between a range shown with two-dot-chain line and solid line in FIG. 2.

Figure 3:
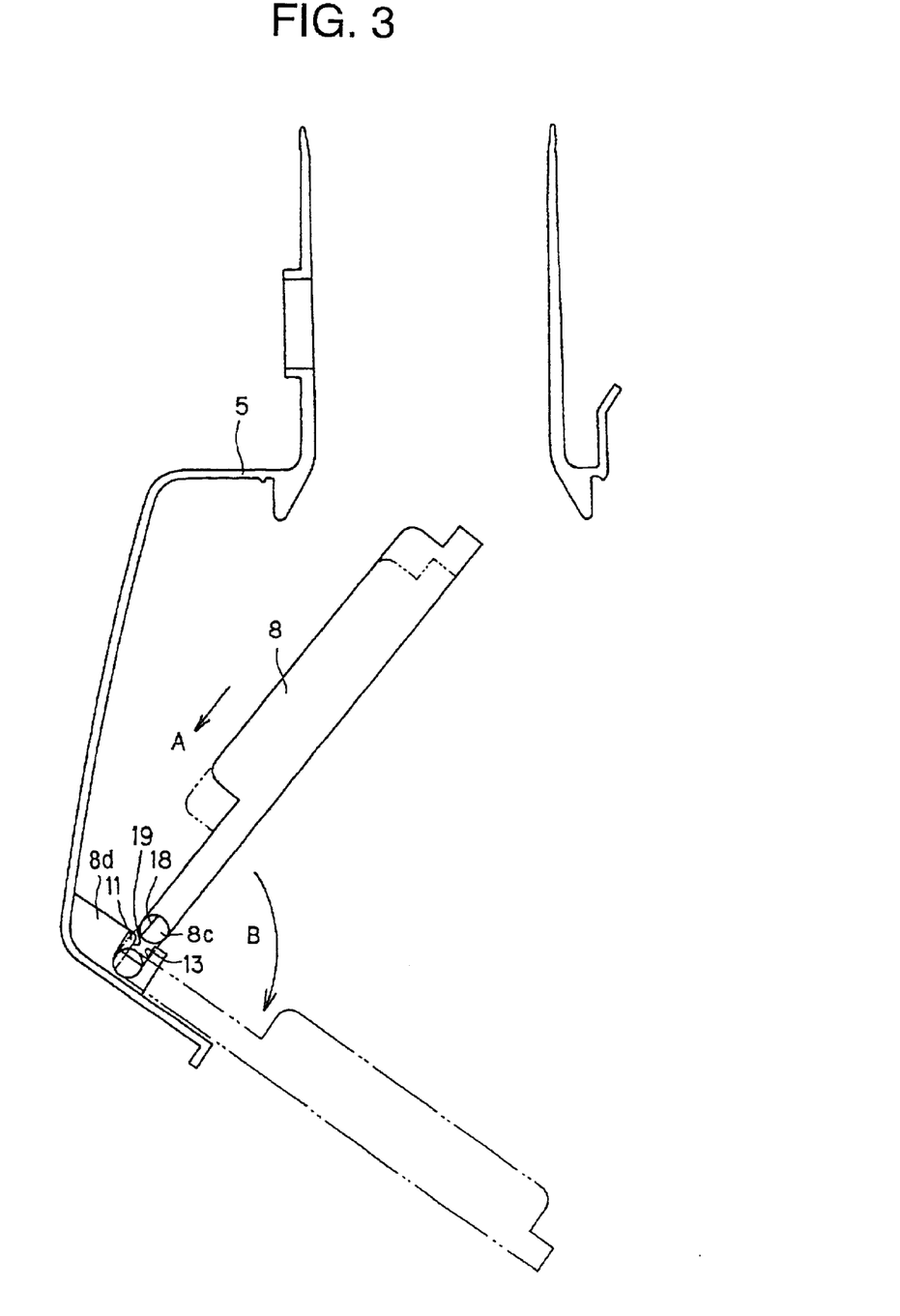
FIG. 3 shows a portion of the air cleaner of FIG. 1 showing a state of mounting a support plate to a pin receiver.

FIG. 3 shows the state that the support plate 8 is mounted to the pin receiver 8d. With reference to FIG. 3, the connection pin 8c is formed with, at its partial portion, a flat surface portion 18 as if it was formed by cutting out a circular portion. The pin receiver 8d is formed with a U-shaped groove 13 to receive the pin 8c and a stopper member 11 having a flat portion 19 is also formed to the pin receiver 8d so as to prevent the pin 8c from coming off from the groove 13 when once engaged therewith.

The connection pin 8c is engaged with (abuts against) the stopper member 11 by moving the support plate 8 in a direction of arrow A at an angle constituted by mating the flat portion 18 of the pin 8c and that 19 of the stopper member 11. Under this state, the support plate 8 is rotated about the pin 8c in a direction of an arrow B, whereby the pin 8c is received in the groove 13 of the pin receiver 8d. According to such engagement of the pin 8c with the pin receiver 8d, the pin 8c is not come off from the pin receiver 8d at the time of attaching or detaching the filter element 6. Further, though not shown, the hinge device may be formed by a structure capable of press-fitting the pin 8c into the groove 13 of the pin receiver 8d.

On the other hand, as shown in FIG. 1, the other support member 9 comprises a tubular section 9b fitted to the inner peripheral portion of the annular closing end portion 6c and a cover inner wall section 9a surrounding the tubular section 9b. The cover inner wall section 9a is formed with a seal portion 9c composed of a ring-shaped projection.

Further, on an inner wall surface of the cover 5, there are arranged guide ribs 12, 12 for guiding the filter element 6 at the time of assembling as briefly shown in FIG. 5, which will be described hereinlater.

Figure 2:
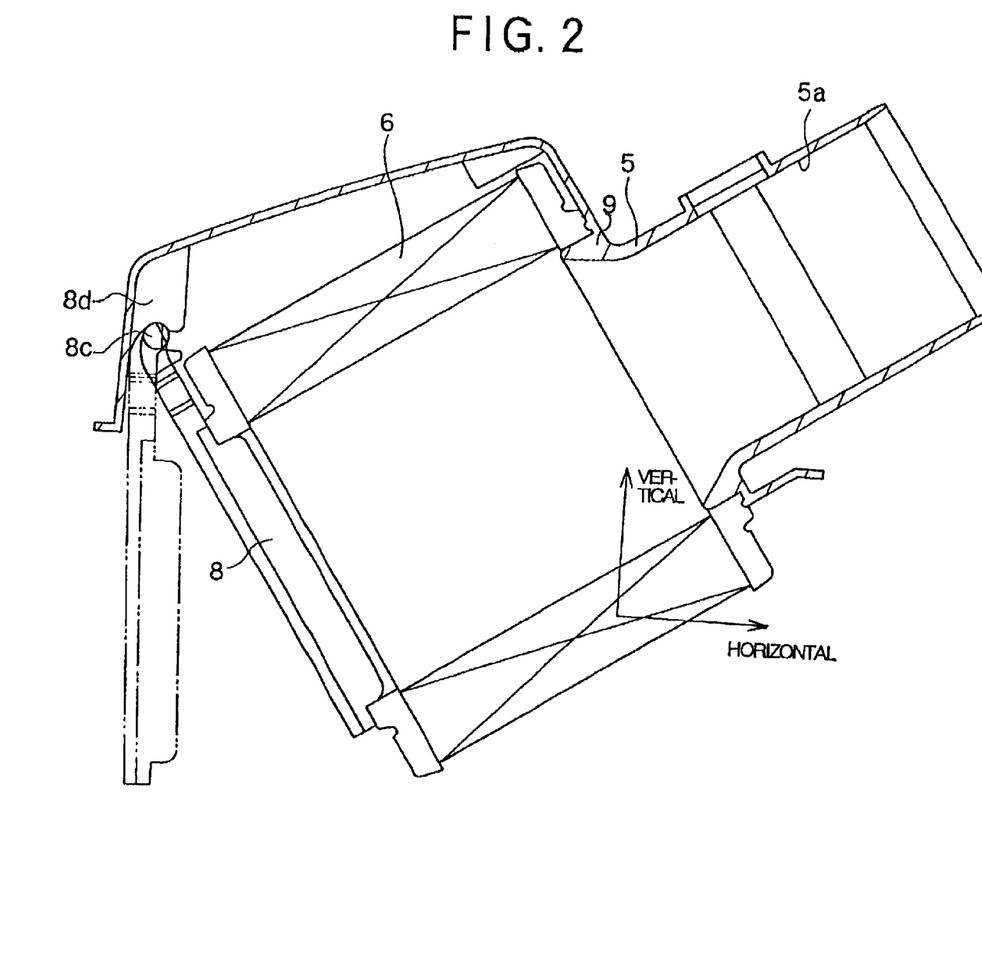
FIG. 2 is a sectional view showing a cover, a filter element and associated portions of the air cleaner of FIG. 1.

In an assembling operation, firstly the closing end portion 6c of the filter element 6 is fitted into the outer peripheral portion of the tubular section 9b of the support member 9, and secondly the support plate 8 is rotated in one direction, for example, in a counterclockwise direction in FIG. 2. According to such motion, the filter element 6 can be engaged with the support members 8 and 9 to hold the same. Then, the filter element 6 can be pressed in the axial direction between the support plate 8 and the cover inner wall section 9a to thereby seal portions between the closing end portion 6b and the support plate 8 and between the closing end portion 6c and the cover inner wall section 9a. On the contrary, when the support plate 8 is rotated (pivoted) in another direction (i.e. clockwise direction in FIG. 2), the engagement between the paired support members 8 and 9 and the filter element 6 can be released, and then, the filter element 6 can be removed from the cover 5. Further, in an alternation in which the closing end portion 6b is not formed with the central opening, it is not necessary to seal the portion between the support plate 8 and the closing end portion 6b, therefore the support plate 8 only attains a function of supporting the filter element 6.

A support member holding rib 10 is provided for an inner surface of the case 7 in an inclined manner. This support member holding rib 10 acts to hold the support plate 8 at a predetermined angle so as to hold the filter element 6 between the support plate 8 and the cover inner wall section 9a at the time of attaching the cover 5, to which the filter element 6 is mounted, to the case 7.

In the state that the filter element 6 is attached to the case 7 in the inclined manner, the axis of the filter element 6 directs a direction (obliquely upward direction in FIG. 2) other than the vertical line with respect to a vehicle body to which an engine having the air cleaner is mounted. The direction of the axis of the filter element 6 is determined so that the air outlet 5a arranged to be coaxially with the filter element 6 is rectilinearly connected in a direction of a throttle body of the engine without bending the air outlet 5a. According to such straight structure of the air outlet 5a, the intake resistance can be reduced.

Figure 4:
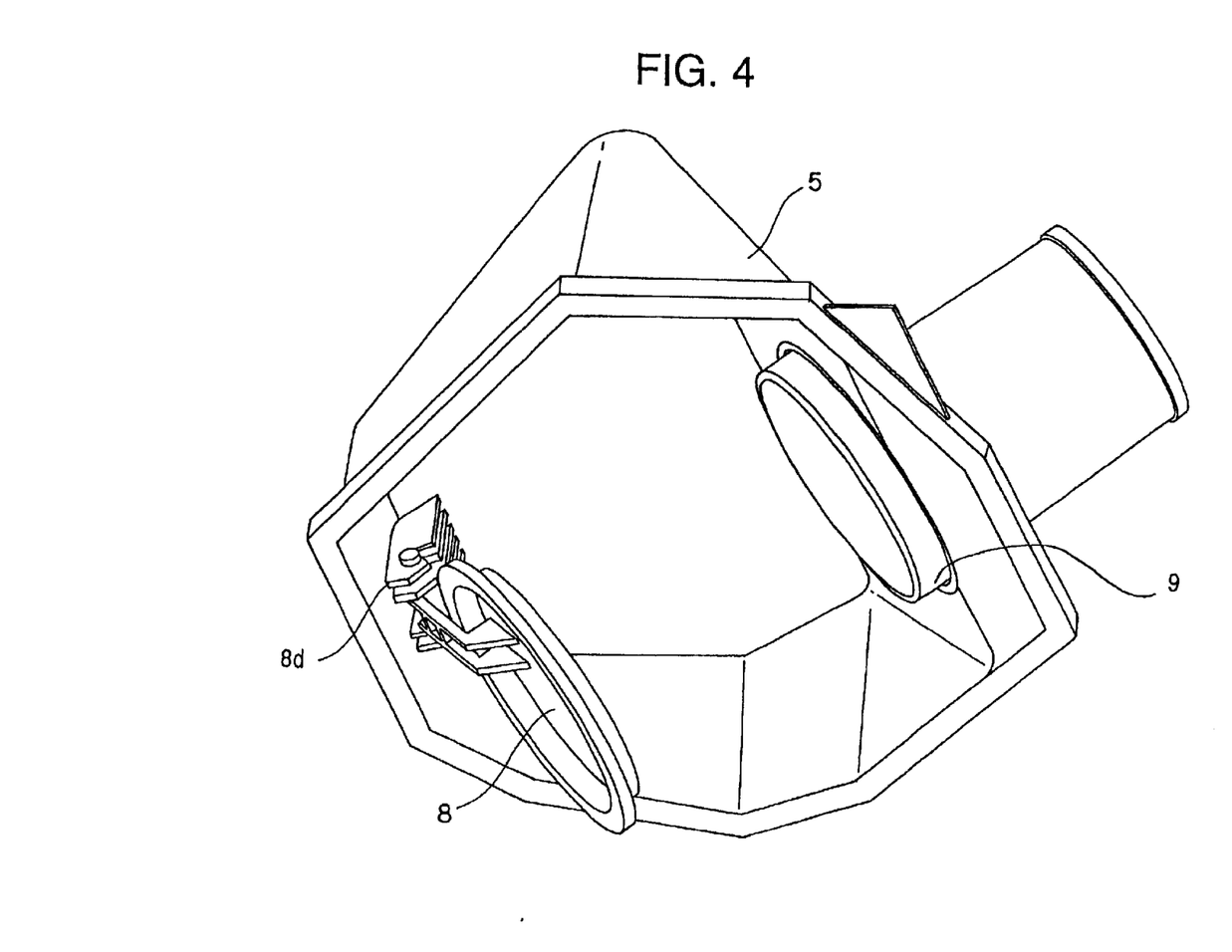
FIG. 4 is a perspective view of the cover of the air cleaner.

FIG. 2 shows the state that the cover 5 and the filter element 6 are removed from the case 7. When the cover 5 is removed from the case secured to the vehicle body side, the filter element 6 is also removed together from the case 7. Then, after the cover 5 and the filter element 6 have been lifted upward to a position not interfering with other peripheral elements or equipments, the support plate 8 will be rotated to the position shown with two-dot-chain line in FIG. 2 and the filter element 6 will be moved in the axial direction. According to this operation, the filter element 6 will be removed from the cover 5 as shown in FIG. 4.

Figure 5:
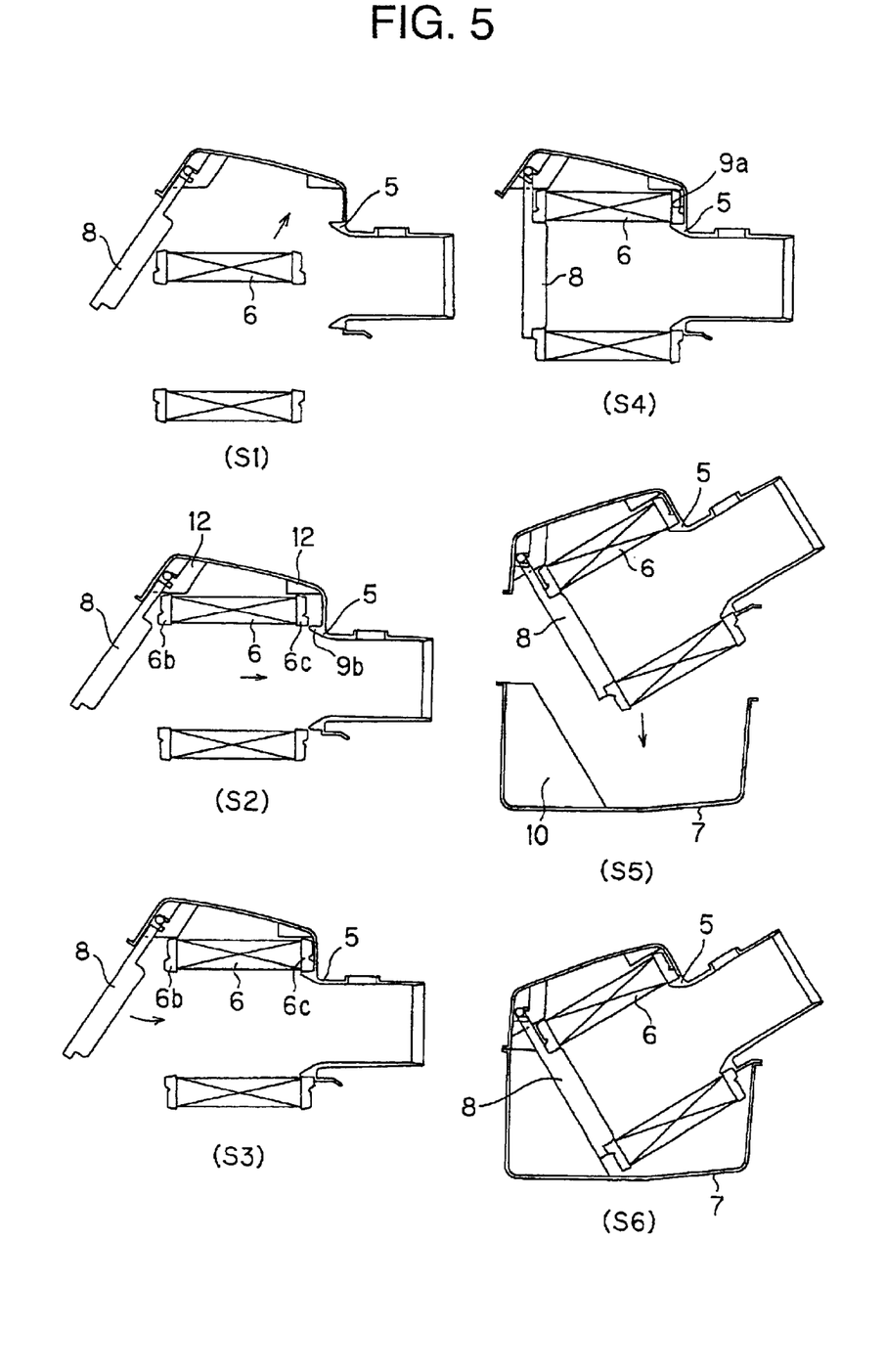
FIG. 5 includes views showing air cleaner assembling steps S1 to S6.

FIG. 5 includes a series of views representing the assembling steps or processes S1 to S6 of the filter element 6.

First, in a step S1, a new filter element 6 after exchanging or cleaning is prepared and the support plate 8 mounted to the cover 5 is rotated in the clockwise direction for mounting the filter element 6. Next, in a step S2, the filter element 6 is assembled with the cover 5 so that the closing end portion 6c of the filter element 6 is fitted to the tubular section 9b of the support member 9 attached to the cover 5. When the filter element 6 is guided to be slid along the guide ribs 12 formed to the inside wall surface of the cover 5, the closing end portion 6c of the filter element 6 is fitted to the tubular section 9b of the cover 5.

In a step S3, the support plate 8 is then rotated in the counterclockwise direction. Then, in a step S4, when the support plate 8 is rotated to a position at which the support plate 8 is fitted to the inner periphery 14 of the closing end portion 6b, the filter element 6 is pressed in its axial direction and then held between the support plate 8 and the cover inner wall section 9a of the support member 9. At this time, both the end portions of the filter element 6 are sealed.

In the next step S5, the cover 5 to which the filter element 6 is mounted is assembled with the case 7, and the support member holding rib 10 abuts against the support plate 8 to thereby hold and maintain the support plate 8 at a predetermined angle. According to the manner mentioned above, the assembling of the filter element 6 together with the cover 5 to the case 7 has been completed as represented in a step S6 of FIG. 5.

Figure 6:
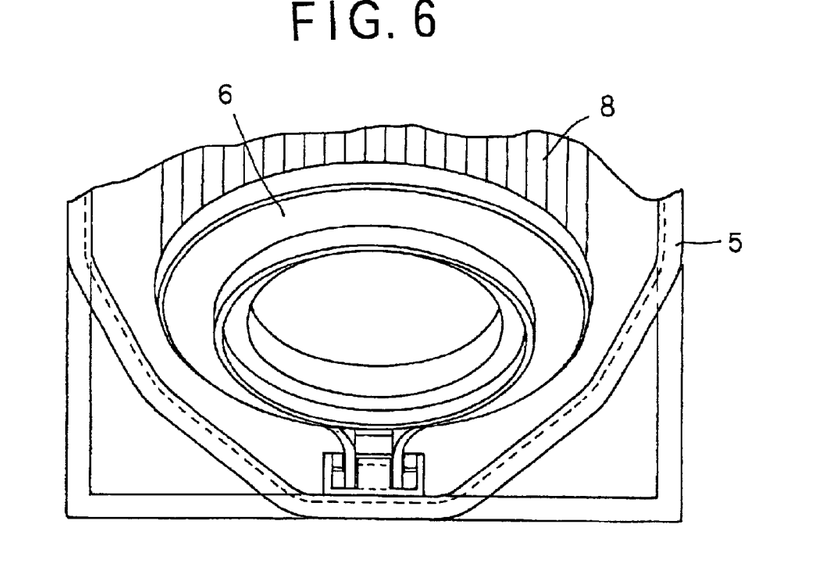
FIG. 6 is a partial perspective view showing a modified example of an air cleaner according to the present invention.

FIG. 6 shows an air cleaner according to a modified embodiment of the present invention. With reference to FIG. 6, if there is a small clearance, of an amount not giving influence of the rotation of the support plate, between the filter element 6 and the cover 5, a case may have a corner portion obliquely cut away. Hence, another type or shape of air cleaner can be adopted to the present invention.

It is therefore noted that the present invention is not limited to the described embodiment and many other changes and modifications may be made without departing from the scope of the appended claims.

That is, for example, the air inlet may be formed to the cover, not to the case, and the shapes of the cover and/or case may be variously changed. According to a structure in which a space is formed around an air filter, silencer effect will be achieved. Furthermore, there may be adopted an arrangement that the axial direction of the filter element may be directed substantially horizontally with respect to a body of a vehicle in spite of obliquely upward direction as mentioned hereinbefore. The pin of the hinge device may be provided for the cover in place of the support plate, and a pin receiver of the hinge device may be provided for the support plate in place of the cover.

Still furthermore, although, in the described embodiment, the support plate 8 is attached to the cover 5 through the hinge device to be rotatable, the support plate may be attached to the cover by means of elastic member such as plate spring without using the described hinge device. In this modified example, the filter element is supported by the cover by utilizing the elastic force (elasticity) of the plate spring.

The present application claims priority under 35 U.S.C §119 to Japanese Patent Application No. 2001-47912, filed Feb. 23, 2001 entitled "AIR CLEANER" The contents of that application are incorporated herein by reference in their entirety.

What is claimed is:

1. An air cleaner comprising:
   a case;
   a cover detachably mounted to the case;
   a filter element accommodated in the case, said filter element having a cylindrical shape having a central axis therealong; and
   a pair of support members mounted to the cover,
   wherein said pair of support members can be engaged with both end portions of the filter element in an axial direction thereof so as to hold the filter element between the support members, wherein removing said cover from the case removes the filter element from the case together with the cover and disengaging said filter element from the support members removes the filter element from the cover, and wherein one of said paired support members is mounted to the cover to be rotatable by a hinge device, and said paired support members can be engaged with said filter element by rotating said one of the paired support members in one direction and disengaged therefrom by rotating the one support member in another direction.

2. An air cleaner according to claim 1, wherein said one of the paired support members comprises a disc plate section, a rotatable shaft attached to the disc plate section and a connection pin connected to the rotatable shaft, and said cover is provided with a pin receiver to receive said connection pin, said connection pin and said pin receiver constituting the hinge device about which said one of support members is rotated.

3. An air cleaner according to claim 2, wherein said pin receiver is formed with a groove into which said connection pin is fitted when rotated.

4. An air cleaner according to claim 1, wherein said cover is provided with a support member holding rib for holding said one of the paired support members at a predetermined angle with respect to the case to hold the filter element between the paired support members.

5. An air cleaner for an engine of a vehicle comprising:

a case;

a cover detachably mounted to the case, said cover having an air outlet through which air flows out;

a filter element accommodated in the case, said filter element having a cylindrical shape having a central axis therealong, said central axis of the filter element being directed in a direction other than a vertical direction with respect to a body of the vehicle to which the engine is mounted; and a pair of support members mounted to the cover, wherein said pair of support members can be engaged with both end portions of the filter element in an axial direction thereof so as to hold the filter element between the support members to be coaxial with an axis of said air outlet, wherein removing said cover from the case removes the filter element from the case and disengaging said filter element from the support members removes the filter element from the cover, wherein a flange portion of said case, to which said cover is mounted, is arranged in a substantially horizontal plane, and wherein said cover is removable in a substantially vertical direction from the body of the vehicle.

6. An air cleaner comprising:

a case;

a cover detachably mounted to the case;

a filter element accommodated in the case, said filter element having a cylindrical shape having a central opening and being detachably mounted to the cover; and a pair of support members integral with the cover, one of said pair of support members comprising a tubular section and another one of said pair of support members comprising a circular disc rotatably mounted to the cover, said filter element being between the support members, such that one end portion of the filter element is between a side wall of the cover and the tubular section and the circular disc is within the central opening at another opposing end portion of the filter element.

* * * * *